United States Patent
Stein

[19]

[11] Patent Number: 5,974,664
[45] Date of Patent: Nov. 2, 1999

[54] RADIATOR MOUTH REPAIR KIT AND METHOD

[76] Inventor: Myron Stein, 31412 Flying Cloud, Leguna Niguel, Calif. 92677

[21] Appl. No.: 09/079,704

[22] Filed: May 15, 1998

Related U.S. Application Data

[63] Continuation-in-part of application No. 08/960,753, Oct. 29, 1997.

[51] Int. Cl.[6] .................................................. B23P 15/26
[52] U.S. Cl. .............................. 29/890.031; 29/402.08; 29/402.18
[58] Field of Search ................... 29/890.031, 402.06, 29/402.08, 402.11, 402.18

[56] References Cited

U.S. PATENT DOCUMENTS

| | | | |
|---|---|---|---|
| 4,310,182 | 1/1982 | Vandenbossche | 285/40 |
| 4,697,634 | 10/1987 | Foucher et al. | 165/76 |
| 4,773,474 | 9/1988 | Stay | 165/76 |
| 4,896,718 | 1/1990 | Trin | 165/141 |
| 4,930,568 | 6/1990 | Janezich et al. | 165/76 |
| 5,169,178 | 12/1992 | Hunzinger | 285/26 |
| 5,363,541 | 11/1994 | Toomey et al. | 29/402.11 |
| 5,437,086 | 8/1995 | Murphree | 29/402.11 |
| 5,522,453 | 6/1996 | Green | 165/41 |

*Primary Examiner*—I Cuda
*Attorney, Agent, or Firm*—Womble Carlyle Sandridge & Rice

[57] ABSTRACT

A method of repairing the broken-off overflow tube nipple of a radiator mouth assembly is provided. The method comprises the steps of preparing the broken-off end portion of the overflow tube nipple by removing a predetermined amount of the end portion until the end portion becomes substantially flat and smooth. A replacement overflow tube nipple assembly is then installed in the prepared end portion of the broken-off nipple to complete the repair.

13 Claims, 5 Drawing Sheets

FIG. 10

RADIATOR MOUTH REPAIR KIT AND METHOD

REFERENCE TO RELATED APPLICATION

This application is a continuation-in-part of pending U.S. patent application Ser. No. 08/960,753 filed Oct. 29, 1997.

TECHNICAL FIELD

The present invention relates generally to automotive repair and more particularly to the repair of radiators and specifically the repair of broken mouth assemblies of radiators.

BACKGROUND OF THE INVENTION

Automotive engines are provided with radiators through which the engine coolant is pumped to cool it after it has absorbed heat from the engine. In most cases, these radiators comprise an array of cooling fins through which coolant tubes extend and that are located at the front of a vehicle. Thus, wind passing through the cooling fins of the radiator efficiently cools the liquid coolant as it passes through the coolant tubes. In addition, radiators are also provided with a reservoir for holding engine coolant. The reservoir, in turn, is provided with a mouth assembly through which coolant can be added to the system. In general, the mouth assembly of a radiator has a generally tubular configuration with an open top end through which coolant can be added to the reservoir. The open top end is configured to receive a sealing cap to close the mouth and seal off the radiator reservoir. The radiator cap is provided with a spring biased gasket that can be overcome when pressure within the reservoir rises above a predetermined level to allow excess pressure and coolant to escape from the reservoir. The spring biased gasket also allows excess water to escape from the reservoir as the water is heated and expanded in volume during normal operation of the engine.

In recent years, radiator mouth assemblies in vehicles have been provided with overflow tube nipples that project outwardly from the tubular body of the mouth assembly. These overflow tube nipples, in turn, are coupled to one end of a flexible overflow hose, which communicates at its other end with an ancillary reservoir within the engine compartment. When coolant escapes from the radiator reservoir as it is heated and expands, it is delivered through the overflow tube nipple and the flexible overflow hose into the ancillary reservoir. When the engine is shut off and the coolant cools and contracts, it is drawn from the ancillary reservoir back through the overflow tube, and into the radiator. In this way, the coolant is not lost from the system and can be drawn back into the radiator as needed.

In the last few years, radiator reservoirs and their mouth assemblies have been formed of molded plastic rather than copper, brass, or other metals that were previously used. The molded plastic is more economical than metal and does not have to be soldered at critical joints as with metal. Accordingly, the molded plastic reservoirs are more reliable than the old metal reservoirs.

One problem with molded plastic radiator reservoirs and their plastic mouth assemblies has been related to the overflow tube nipple that projects outwardly from the tubular body of the mouth assembly and receives an end of the overflow hose. With these plastic mouth assemblies, it is not uncommon for the overflow nipples to become brittle and to be broken-off during normal maintenance procedures on the engine. Once broken-off, the overflow tube nipple will not receive the end of the overflow hose in a sealing manner and coolant can leak from the system. In the past, when an overflow tube nipple was broken-off in this manner, the entire radiator reservoir and its mouth assembly had to be replaced since they are all molded as a unitary plastic element. Obviously, such replacement is time consuming and expensive and results in unexpected repair cost when an overflow tube nipple is accidentally broken-off.

Breakage of overflow nipples of plastic radiator mouth assemblies is also common fabrication facilities where plastic radiator reservoirs are injection molded and in assembly plants where they are assembled with other components to build a radiator. When breakage occurs in such facilities, it has been the practice simply to discard the entire plastic reservoir, which is ground up with other discarded plastic pieces and reused in injection molds. Obviously, the discarding and reuse of radiator reservoirs simply because their overflow nipples are broken off is a wasteful and expensive process.

Accordingly, there exists a need for a method of repairing the broken-off overflow tube nipple of a plastic radiator mouth assembly without the necessity of removing and replacing the entire radiator reservoir and in such a way as to avoid the discarding of broken reservoirs in fabrication and assembly plants. It is to the provision of such a method and to a kit for performing the method that the present invention is primarily directed.

SUMMARY OF THE INVENTION

Briefly described, the present invention, in a preferred embodiment thereof, comprises a method of repairing the broken-off overflow tube nipple of a radiator mouth assembly without the necessity of replacing or discarding the entire radiator reservoir. The method is intended for repairing broken-off overflow tube nipples of plastic radiator assemblies; however, it may also be applied to radiator mouth assemblies made of metal or other materials. The method, in one embodiment, comprises the steps of preparing the broken-off end portion of the overflow tube nipple by removing a predetermined amount of the end portion until the resulting end of the nipple becomes substantially flat and smooth. In one embodiment, a sufficient amount of the nipple is removed so that the resulting flat smooth surface is substantially flush with the tubular body of the radiator mouth assembly. In another embodiment, a predetermined amount of the broken-off end portion of the nipple is removed so that the remaining stub of the nipple projects a predetermined distance from the body portion of the radiator mouth assembly.

Once the broken-off end portion of the overflow tube nipple has been prepared, the method includes the further step of installing a replacement overflow tube nipple in the prepared end portion for affecting the repair and for receiving the end of an overflow hose. In a first embodiment, this is accomplished by inserting a threaded annular boss through the prepared overflow tube nipple from the inside of the mouth assembly until the threaded portion of the boss protrudes from the assembly. A replacement overflow tube nipple is then threaded onto the protruding threaded portion of the boss. At least one gasket in the form of a rubber O-ring is positioned between the replacement overflow tube nipple and the prepared flat smooth end of the broken-off nipple and the replacement nipple is tightened against the gasket. This prevents leakage of coolant from the repaired area.

In a second embodiment, the prepared stub of the broken-off nipple is internally threaded with a tap and a replacement nipple having external threads is threaded into the tapped prepared nipple. The replacement nipple is provided with a shoulder and a gasket in the form of a rubber O-ring is positioned between the shoulder and the flat smooth prepared end of the broken-off nipple to prevent leaks from the prepared area.

In yet another embodiment, the method of this invention comprises the steps of inserting a stop in the open mouth of the assembly and cutting away the broken overflow nipple with a stepped rotary cutter. The stepped cutter has a dual diameter cutter head that smoothly cuts away the broken nipple, forms a hole or port of a predetermined diameter through the wall of the radiator mouth, and cuts a flat recessed lip in the wall of the mouth surrounding the port. As the rotary cutter progresses through the material of the radiator mouth, its internal end engages the stop in the open mouth to stop the progress of the cutter when the recessed lip has been cut to precisely the proper depth. Thus, the stop prevents the stepped cutter from being advanced completely through the wall of the mouth and insures that the recessed lip around the port has been cut to the proper depth.

With the port and lip thus cut, the cutter and stop are removed from the radiator mouth. A tubular insert having a curved radially extending flange on one end is inserted through the port from the inside of the radiator mouth until the flange rests against the inner wall of the mouth. A gasket is then slipped over the insert until it rests against the recessed lip around the port through which the insert extends. Finally, a replacement nipple is slipped over the insert and threaded onto the insert until the gasket is compressed against the end of the replacement nipple and the recessed lip to form a seal.

In each embodiment, the repair is completed quickly and easily and at a minimum of cost. When the replacement nipple has been attached to the radiator mouth assembly, the overflow hose is attached to the replacement nipple and the repair is complete.

Thus, it is an object of this invention to provide a method of repairing the broken-off overflow tube nipple of a radiator mouth assembly that is quick, easy, and economical to perform.

Another object of the invention is to provide a method of repairing the broken-off overflow tube nipple of a radiator mouth assembly that eliminates the need to replace the entire radiator reservoir and mouth assembly when the original overflow tube nipple is broken.

A further object of the invention is to provide a kit that can be used by automotive repair persons to repair the broken-off overflow tube nipple of a radiator mouth assembly quickly and easily when the nipple is accidentally broken-off.

An additional object of the invention is to provide a repair method for overflow tube nipples of radiator mouth assemblies that is so easy, efficient, and economical that additional and unexpected repair bills to customers can be avoided.

A still further object of the invention is to provide a method of repairing plastic radiator reservoirs at the factory so that they can be used in a radiator rather than discarded for remelting.

These and other objects, features, and advantages of the present invention will become more apparent upon review of the detail descriptions set forth below when taken in conjunction with the accompanying drawings, which are briefly described as follows.

DETAILED DESCRIPTION OF THE PREFERRED EMBODIMENTS

Figure 1:
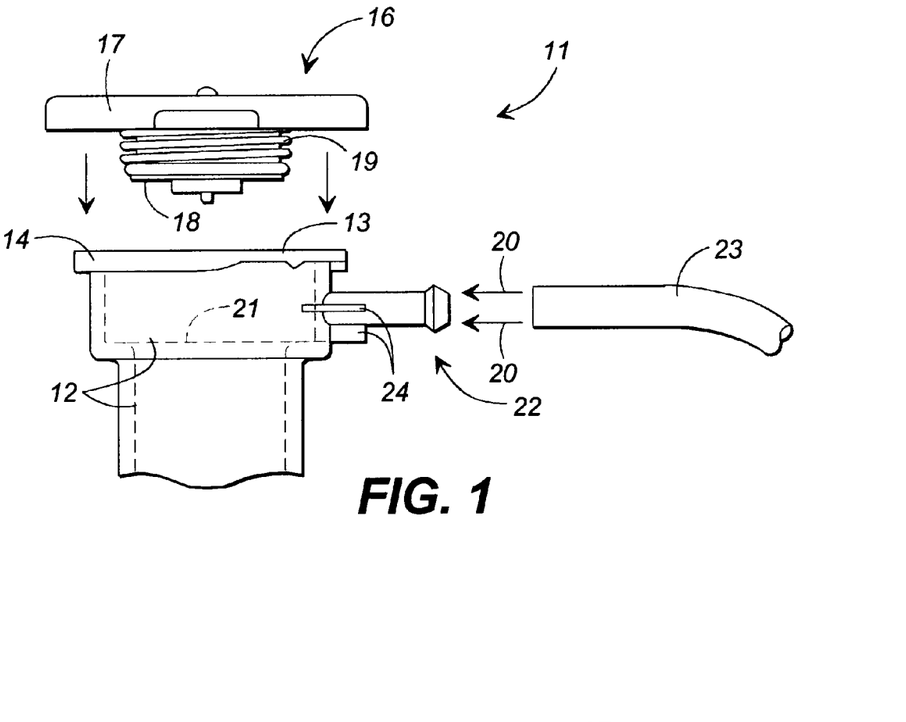
FIG. 1 is a side elevational partially exploded view of a typical molded plastic radiator mouth assembly illustrating a common overflow tube nipple configuration.

Referring now in more detail to the drawings, in which like numerals refer to like parts throughout the several views, FIG. 1 illustrates a typical modern radiator mouth assembly formed primarily of molded plastic. The assembly 11 comprises a radiator mouth having a tubular body portion 12, an open top 13 for receiving coolant to replenish the reservoir, and a contoured rim 14 for receiving a radiator cap 16. The radiator cap 16 typically is formed of metal and has a top 17 that is configured to be tightened onto the rim 14 of the assembly 11. The cap 16 is further provided with a gasket 18, typically of rubber, that is downwardly biased by a coil spring 19. The interior of the tubular body portion 12 is formed with an internal shoulder 21, illustrated in phantom lines in FIG. 1. When the radiator cap 16 is inserted into the open top 13 of the body portion 12 and rotated, the top 17 locks into place on the rim 14 with the gasket 18 being spring biased into engagement with the shoulder 21 within the body portion 12. This functions to seal off the radiator reservoir.

The tubular body portion 12 is further formed with an overflow tube nipple 22 that communicates with the upper portion of the tubular body and projects transversely therefrom. Plastic radiator mouth assemblies generally are formed with support ribs 24, which function to support the overflow tube nipple 22 and prevent it from bending and flexing under the stress of operation. The end of the overflow tube nipple 22 is configured to receive an overflow hose 23, which couples the tube 22 to an auxiliary coolant reservoir (not shown). The overflow hose 23 is coupled to the nipple 22 by being inserted over the end portion thereof as illustrated by arrows 20.

In normal operation of an engine, coolant within the radiator reservoir is heated by absorbing heat from the engine. As the coolant is heated, it expands within the reservoir. The expanding coolant forces the gasket 18 upwardly and out of sealing engagement with the shoulder 22, allowing coolant to escape into the upper portion of the tubular body 12. This excess coolant, then, is delivered to the auxiliary reservoir by flowing through the overflow tube nipple 22, through the overflow hose 23, and into the auxiliary reservoir. As the engine as coolant cools after operation, the contracting coolant within the reservoir draws the excess coolant back from the auxiliary reservoir into the radiator reservoir. In this way, a closed system is formed and radiator coolant is not lost as a result of expansion and contraction of the coolant. In addition, should the engine and coolant overheat, the resulting steam and pressure can also escape by pressing the gasket up and being delivered to the auxiliary reservoir in the same way.

Figure 2:
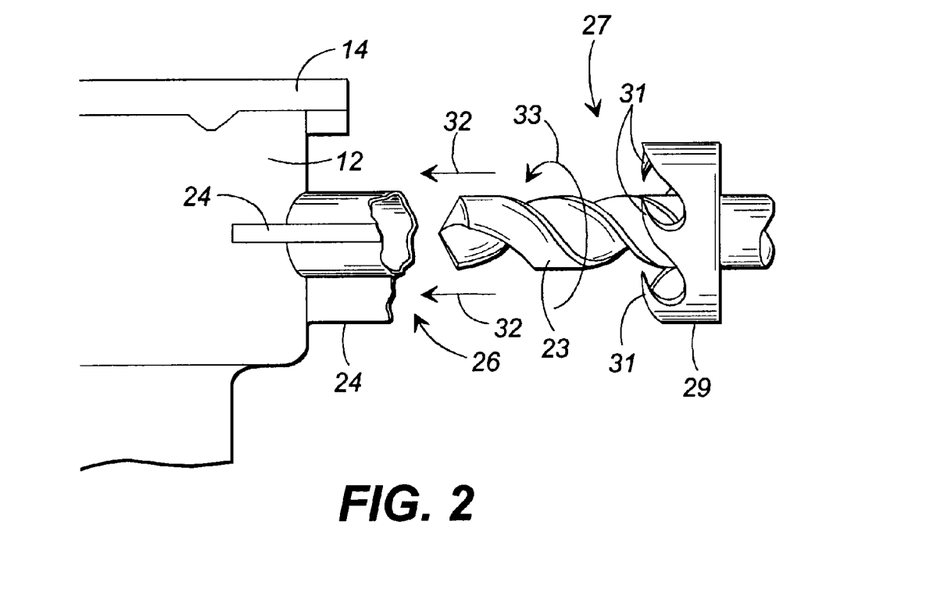
FIG. 2 illustrates a radiator mouth assembly having a broken-off overflow tube nipple and also illustrates the step of preparing the broken-off end according to the method of the present invention.

FIG. 2 illustrates the problem to which the present invention is directed and also illustrates one of the steps of the process of this invention. It is not uncommon, during normal maintenance of an engine, that a mechanic inadvertently breaks off the overflow tube nipple 22 extending from the radiator mouth assembly. This can be a particularly acute problem with older vehicles in which the plastic of the mouth assembly may have become brittle over time. The result is a jagged broken-off end 26, which, in many cases, extends into the region of the support ribs 24. As a result, the overflow hose 23 cannot be inserted onto the overflow tube nipple in such a way that a seal is formed therebetween. The system then becomes useless for its intended purpose and the broken-off overflow tube nipple must be replaced or repaired. In the past, this has been accomplished by replacing the entire radiator reservoir since the reservoir, reservoir mouth, and overflow tube nipple are formed of a unitary piece of molded plastic. As mentioned above, this has resulted in delays and unexpected repair cost for owners.

Another situation in which overflow nipples can be broken off occurs in the plastics mill where the plastic reservoirs are injection molded and in the fabrication plant where radiators are assembled or installed in new vehicles. In the plastics mill, newly molded reservoir components are sometimes subjected to rough handling causing their overflow nipples to break off. In the past, these broken components have simply been discarded in the recycling bin for reprocessing and reuse in the injection molding process. Obviously, this is inefficient and expensive, particularly where the breakage occurs at the assembly facility.

The method of the present invention comprises, first, preparing the broken-off end 26 of the overflow tube nipple to shape it into a flat relatively smooth configuration. This is accomplished, in a preferred embodiment, with a preparation tool 27. The tool 27 comprises a shank 28 having an outer diameter that is substantially the same as the inner diameter of the overflow tube nipple. The shank 28 shown in FIG. 2 comprises a common drill bit; however, the shank might also be simply a steel rod or may take on another shape. The purpose of the shank 28 is to align the tool with the axis of the overflow tube nipple and a variety of shank shapes might accomplish this goal.

A cutter head 29 is secured on the shank 28 at a position spaced from its end. The cutter head 29 is formed of a hardened metal and is provided with an array of cutter blades or teeth 31 that are sharpened and formed on one side of the cutter head 29. The cutter head is firmly secured on the shank 28 so that, as the shank rotates, the cutter head is also rotated. The teeth 31 are designed and sharpened so that they cut away the plastic of the overflow tube nipple in a smooth and ordered way in order to form a substantially flat smooth end on the broken-off overflow tube nipple. It will be understood that while a particular configuration of the teeth 31 and cutter head 29 are shown in FIG. 2, a variety of configurations are possible and all such configurations should be deemed within the scope of the present invention. For example, the head could be formed with one or more slots that hold replaceable cutter blades, could be formed with spiral cutting surfaces, or could take on other configurations.

In using the tool 27 to prepare the broken-off end 26, the distal end of the shank 28 (not shown) is inserted into a drill and the proximal end is inserted into the broken-off end of the overflow tube nipple as illustrated by arrows 32. This functions to align the tool and the cutter head 29 axially with the overflow tube nipple. The drill is then activated to rotate the tool 27 and the cutter head 29 is pressed against the broken-off end of the overflow tube nipple. The teeth 31 on the cutter head 29 begin to cut away the material of the overflow tube nipple. This, in turn, removes material, shortens the nipple, and forms a substantially flat smooth end on the stub of the broken-off overflow tube nipple. When a predetermined amount of material is removed and a smooth flat end is formed, the tool 27 is extracted and the broken-off overflow tube nipple is prepared for the next step of the process.

Figure 3:
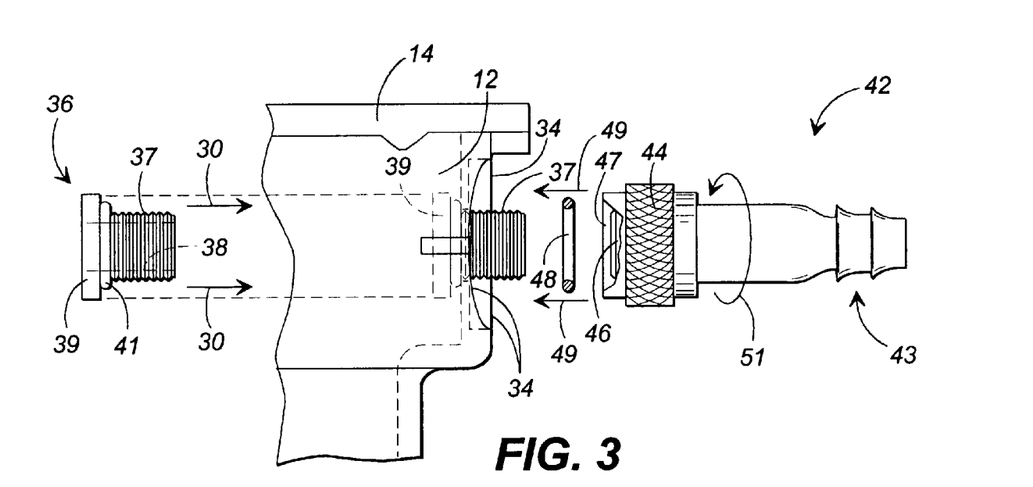
FIG. 3 illustrates a first embodiment of a replacement overflow tube nipple and its installation according to the present invention.

FIG. 3 illustrates a first embodiment of the next step of the method of this invention. In this embodiment, it can be seen that the broken-off overflow tube nipple has been prepared with the tool 27 by removing a sufficient amount of the nipple so that the resulting smooth flat end is substantially flush with the tubular body 12 of the radiator mouth. This produces a flat smooth surface surrounding the opening to the tubular body as illustrated at 34 in FIG. 3. A boss 36 having external threads 37, an internal bore 38, and a radially projecting rim 39 is then inserted through the opening as illustrated by arrows 30 until the threads 37 project from the exterior surface tubular body 12. A gasket 41, which preferably is a rubber O-ring, is positioned between the rim 39 and the interior wall of the tubular body 12 to aid in sealing against leaks.

A replacement overflow tube nipple 42 having a fluted end portion 43, a knurled collar 44, and internal threads 46 is threaded onto the protruding end of the boss 36 as illustrated by arrows 49 and 51. The replacement nipple 42 is formed with an inwardly chamfered end 47 that rests adjacent to the flat smooth end 34 of the prepared broken-off nipple when the replacement nipple is threaded into place. A gasket 48, preferably in the form of a rubber O-ring, is positioned between the smooth flat end 34 and the replacement nipple 42. The gasket 48 surrounds the protruding end of the boss 36 and becomes captured between the smooth flat end of the prepared nipple and the inwardly chamfered end 47 of the replacement nipple. The O-ring thus becomes compressed against the smooth flat end 34 and the chamfered end 47, forming a seal that prevents coolant from leaking from the repair. This is one way in which the first step of the process is important because the smooth flat end that results from preparation with the tool 27 helps to form a seal against coolant leakage.

When the replacement nipple is installed and tightened, the overflow hose that originally was attached to the broken-off nipple is attached to the end of the replacement nipple and the repair is complete. The entire process is quick, efficient, and forms an air tight and water tight repair that functions in precisely the same way as the original overflow tube nipple.

Figure 4:
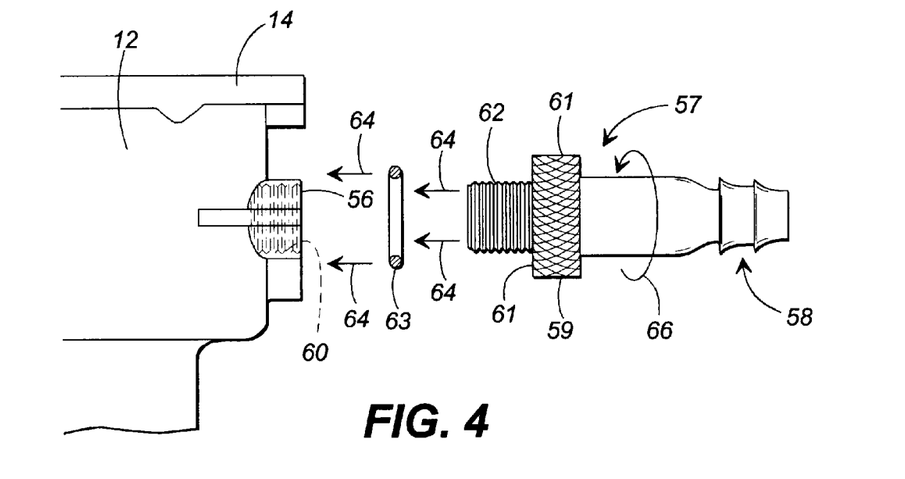
FIG. 4 illustrates a second embodiment of a replacement overflow tube nipple and its installation according to the present invention.

FIG. 4 illustrates a second embodiment of the process of this invention. In this embodiment, the broken-off overflow tube nipple is prepared by using the tool 27 in the same way as with the embodiment of FIG. 3. However, in this embodiment, a predetermined amount of the broken-off end portion of the nipple is removed so that the remaining portion or stub of the nipple projects a predetermined distance from the body portion of the radiator mouth assembly rather than being flush therewith as with the first embodiment. The result is a stub having a substantially flat smooth end 56.

The internal passageway 60 of the broken-off nipple is then threaded with an appropriate tap (not shown) to form internal threads therein. A replacement overflow nipple 57 having a fluted end 58, a knurled collar 59, and an externally threaded end 62 is then threaded into the threaded stub as illustrated by arrows 64 and 66. The knurled collar 59 forms an annular shoulder 61 on the replacement overflow nipple 57. A gasket 63, preferably in the form of a rubber O-ring, is positioned between the shoulder 61 and the flat smooth end 56 of the prepared broken-off nipple. As the replacement nipple 57 is threaded tightly into place, the gasket 63 becomes captured and compressed between the end 56 and the shoulder 61 to form a water tight seal against coolant leakage at the location of the repair. With the replacement overflow nipple 57 thus installed, the overflow hose can be inserted onto the fluted end 58 of the replacement nipple to complete the repair. As with the first embodiment, the method of this embodiment is also quick, efficient, and inexpensive and eliminates unnecessary repairs and repair costs.

Figure 5:
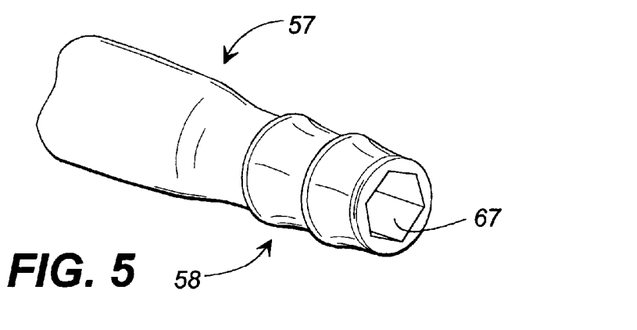
FIG. 5 illustrates a preferred configuration of the internal passageway of an overflow tube nipple configured according to the present invention.

FIG. 5 illustrates a preferred configuration of the internal passageway 67 of the repair nipple 57 for facilitating the method of this invention. The internal passageway 67 is seen to be shaped to receive a tightening tool for rotating the replacement overflow tube nipple to thread it into position on the tubular body portion of the radiator mouth assembly. In the preferred embodiment of FIG. 5, the internal passageway 67 is formed with a hexagonal cross section in order to receive a common alan wrench for rotating and tightening the replacement nipple 57. However, it will be clear to those of skill in the art that other configurations of the passageway 67 are possible for accommodating a wide variety of tightening tools. Accordingly, the hexagonal configuration shown in FIG. 5 as a preferred embodiment should not be considered a limitation of the present invention.

While this invention primarily encompasses a process or method of repairing a broken-off overflow tube nipple, it also contemplates a repair kit for carrying out this method. The repair kit comprises a tool for preparing the broken-off end portion of the overflow tube nipple of a radiator mouth assembly by removing a predetermined amount of the nipple until the end portion of the nipple becomes substantially flat and smooth. The kit further includes a replacement overflow tube nipple adapted to be installed in the prepared end portion of the broken-off overflow tube nipple. The replacement nipple is configured, when installed, to receive the end of an overflow hose to direct coolant to an auxiliary reservoir within the engine compartment. The kit can include, in one embodiment, a replacement overflow tube nipple that has a threaded annular boss for insertion through the prepared broken-off overflow tube nipple from the inside of the radiator mouth assembly until he threaded portion of the boss protrudes from the assembly. An internally threaded replacement nipple is then threaded onto the protruding end of the boss and tightened into place. Such a kit preferably would also include appropriate gaskets as illustrated and discussed above, a tap for forming internal threads in the broken-off overflow tube nipple, and a wrench, such as an alan wrench, for rotating and tightening the replacement nipple into place. A kit for performing the method illustrated in FIG. 4 would include a replacement nipple having one end provided with external threads for threading into the stub of the broken-off overflow tube nipple.

Figure 6:
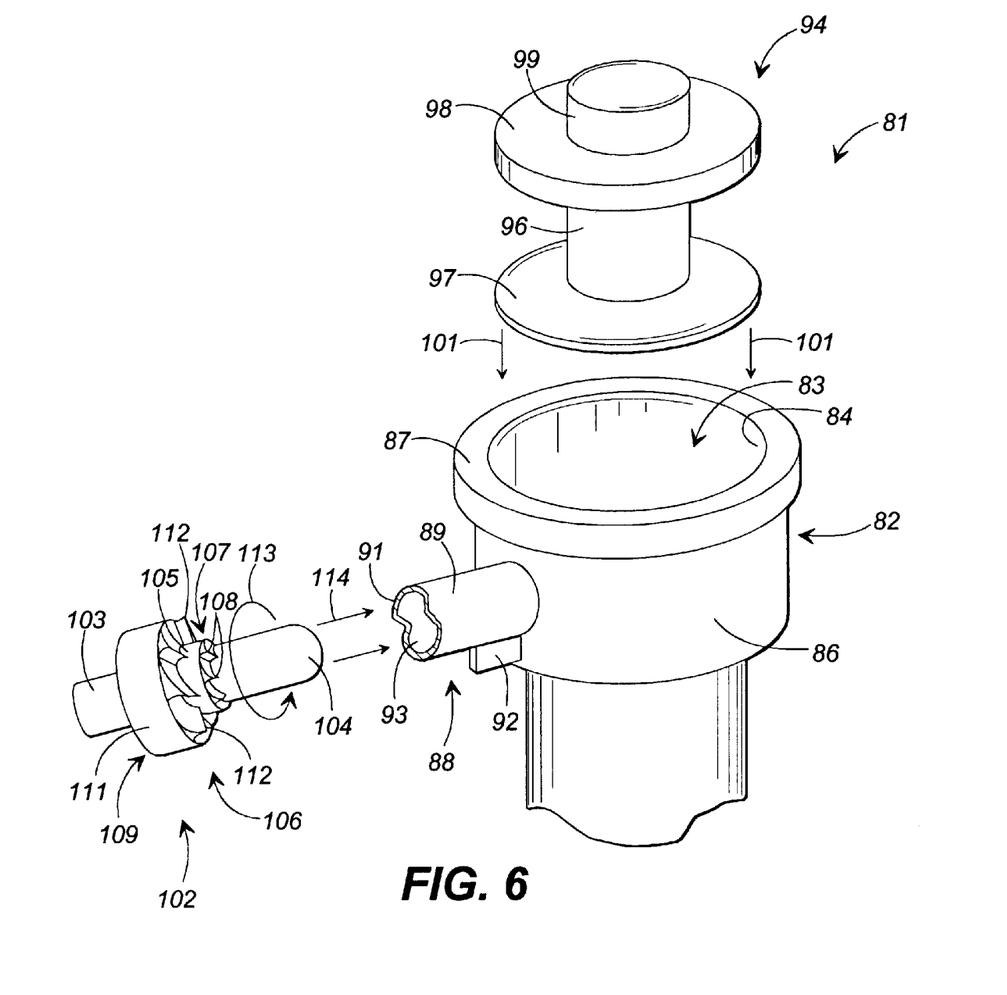
FIG. 6 is a perspective view illustrating a third embodiment of the radiator repair kit and method of this invention.

FIGS. 6 through 10 illustrate yet another embodiment of the method and system of the present invention. FIG. 6 shows a plastic radiator mouth assembly 81 under repair using the process of this invention. A plastic radiator mouth 82 has an upwardly open top 83 defined by a mouth wall having an inner wall surface 84 and an outer wall surface 86. A contoured lip 87 is formed around the top of the mouth for receiving a radiator cap, as discussed above. The radiator mouth 82 is seen to have a tubular overflow nipple 88 having a stem 89 that defines an interior passageway 93, which communicates with the interior of the radiator mouth. The overflow nipple is seen to have been broken off, resulting in a jagged broken end 91 and a radiator mouth assembly in need of repair. A reinforcement rib 92 is provided for bracing and reinforcing the overflow nipple 88, however some radiator mouth assemblies do not include such ribs and others may include more than one reinforcement rib.

Figure 7:
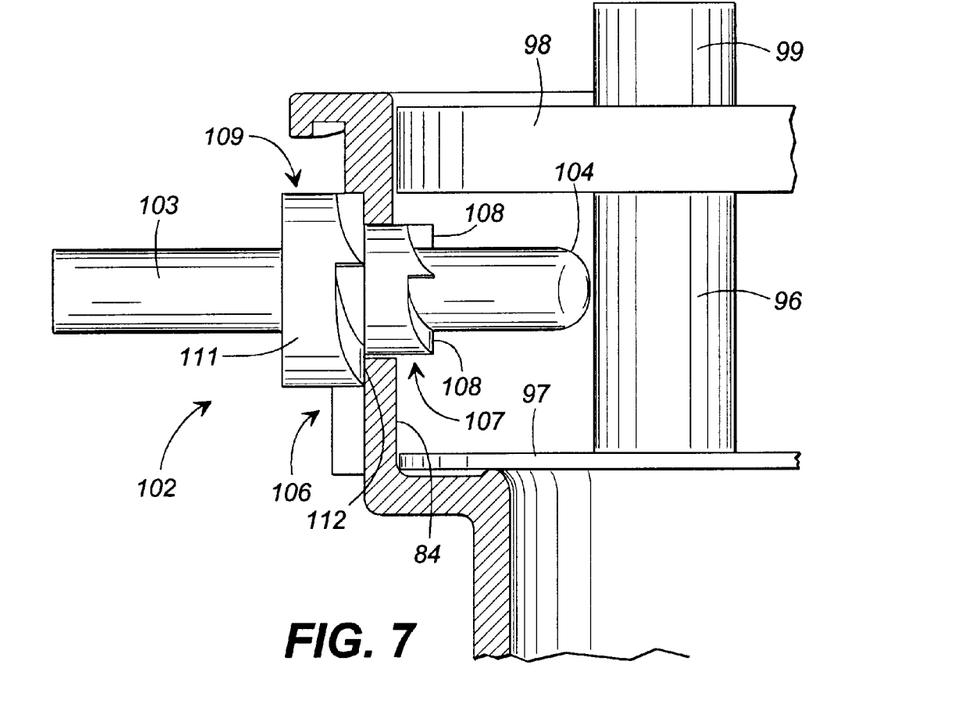
FIG. 7 is a side partially cross-sectional view showing use of the stepped cutter assembly of the present invention to prepare a broken radiator mouth for receiving a replacement overflow nipple.

A generally spool shaped stop 94 has a cylindrical central hub 96 from which a disc-shaped lower flange 97 and a disc-shaped upper flange 98 radially project. A handle 99 projects upwardly from the upper flange 98 and provides a means for grasping the stop 94 for inserting and removing the stop from the open top 83 of the radiator mouth assembly as indicated by arrows 101. The upper flange 98 and the lower flange 97 of the stop 94 are formed with a diameter that is slightly less than the diameter of the inner wall 84 of the radiator mouth's open top 83. Thus, as best illustrated in FIG. 7, when the stop 94 is inserted into the open top 83 of the radiator mouth assembly, its lower flange 97 rests on the lip of the open top and its flanges fit snugly in the open top for positioning and holding the central hub in place extending along the longitudinal axis of the mouth assembly. The stop 94 preferably is formed of plastic or aluminum, but can also be formed of any other appropriate alternate material and the present invention is intended to incorporate stops made of all such alternate materials.

With continued reference to FIG. 6, the present invention further includes a rotary cutting tool 102 for preparing the broken off overflow nipple of the radiator mouth assembly for subsequent repair according to principles of the invention. The cutting tool 102 comprises a central shaft 103 adapted to be mounted in and rotated by the chuck of a drill (not shown). The shaft has a forward end portion 104 that, in the preferred embodiment, is rounded and smoothed for purposed described in more detail below.

A stepped cutter head 106 is mounted on the shaft 103 and is spaced a predetermined distance from the forward end 104 of the shaft. The stepped cutter head 106 comprises a generally annular relatively smaller cutter 107 having a cylindrical body portion 105 and an array of sharpened cutter teeth 108 configured to cut when the shaft 103 is rotated in the direction indicated by arrow 113. A generally annular relatively larger cutter 109 is disposed behind the smaller cutter 107 and is similar in configuration, having a generally cylindrical body 11 and being formed with an array of sharpened cutter teeth 112. Together, the relatively smaller cutter 107 and the relatively larger cutter 109 form and define the stepped cutter head 106. In use, the cutting tool 102 is secured in the chuck of a drill and is rotated with the drill while its forward end 104 is inserted in and advanced through the interior passageway of the broken overflow nipple 88 to prepare the nipple for subsequent repair, according to the method of this invention.

Figure 8:
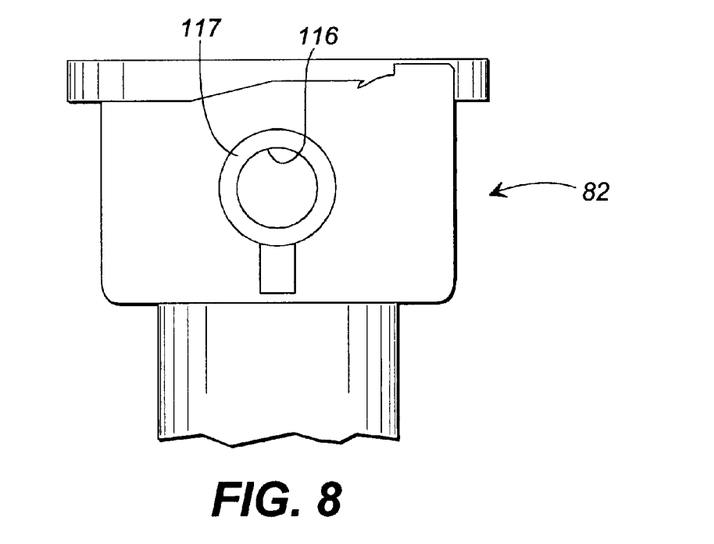
FIG. 8 is a side plan view of a radiator mouth that has been prepared with the stepped cutter of FIG. 7 for receiving a replacement nipple assembly.

FIGS. 7 and 8 illustrate use of the stop 94 and cutting tool 102 of this invention to prepare the broken overflow nipple of a radiator mouth for subsequent steps of the repair process. As mentioned above, the process begins by rotating and advancing the shaft of the cutting tool 102 through the internal passageway of the overflow nipple. As the cutting tool 102 is advanced, the relatively smaller cutter 107 engages the end of the overflow tube nipple and begins to cut away the material of the nipple with its sharpened cutters 108. In the preferred embodiment, the outer diameter of the relatively smaller cutter 107 is the same as or slightly larger than the outer diameter of the overflow nipple. Thus, the relatively smaller cutter 107 initially accomplishes all of the cutting away of the broken overflow nipple. However, as the relatively smaller cutter 107 approaches and begins to cut through the wall of the radiator mouth, the relatively larger cutter 109 engages the outer surface of the radiator mouth in the region surrounding the now cut away overflow nipple.

When the relatively larger cutter 109 has advanced a predetermined desired distance into the material of the mouth, the forward end 104 of the shaft 103 engages the hub 96 of the stop 94, stopping the forward progress of the cutting tool. At this point, the preparation of the radiator mouth for subsequent steps of the repair process is completed and the cutting tool 102 as well as the stop 94 can be retracted from the radiator mouth and put away until needed for the next repair.

FIG. 8 illustrates the result of the just described preparation process. The broken off overflow nipple of the radiator mouth 82 is seen to have been cut completely away by the stepped cutting tool. The result is a circular bore or port 116 cut by the relatively smaller diameter cutter 107 completely through the wall of the radiator mouth and having a diameter corresponding to the diameter of the relatively smaller cutter 107. Surrounding the port 116 is an annular recessed lip 117 cut by the relatively larger diameter cutter 109 and having a diameter corresponding to the diameter of the relatively larger diameter cutter 109. The larger diameter cutter 109 also cuts away any reinforcement ribs 92 that may be formed on the radiator mouth assembly 82. It will be understood by those of skill in the art that, whereas the wall of the radiator mouth 82 is curved, the recessed lip 117 formed by the relatively larger diameter cutter 109 is flat and not curved. This provides advantages in subsequent steps of the invention as discussed in more detail below.

Figure 9:
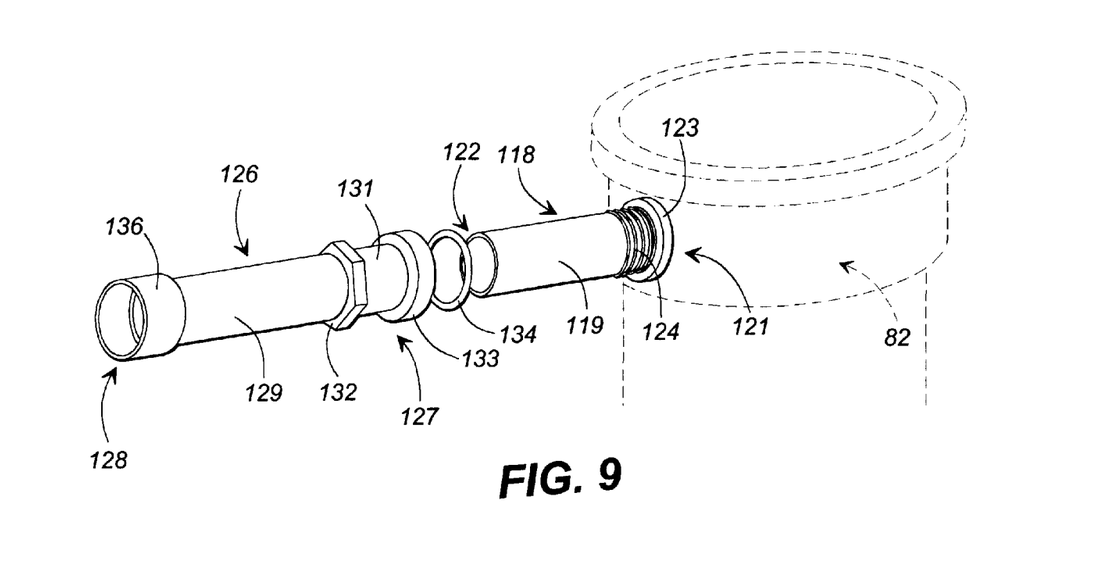
FIG. 9 is an exploded perspective of a replacement overflow nipple assembly that embodies principles of the present invention is one preferred form.
Figure 10:
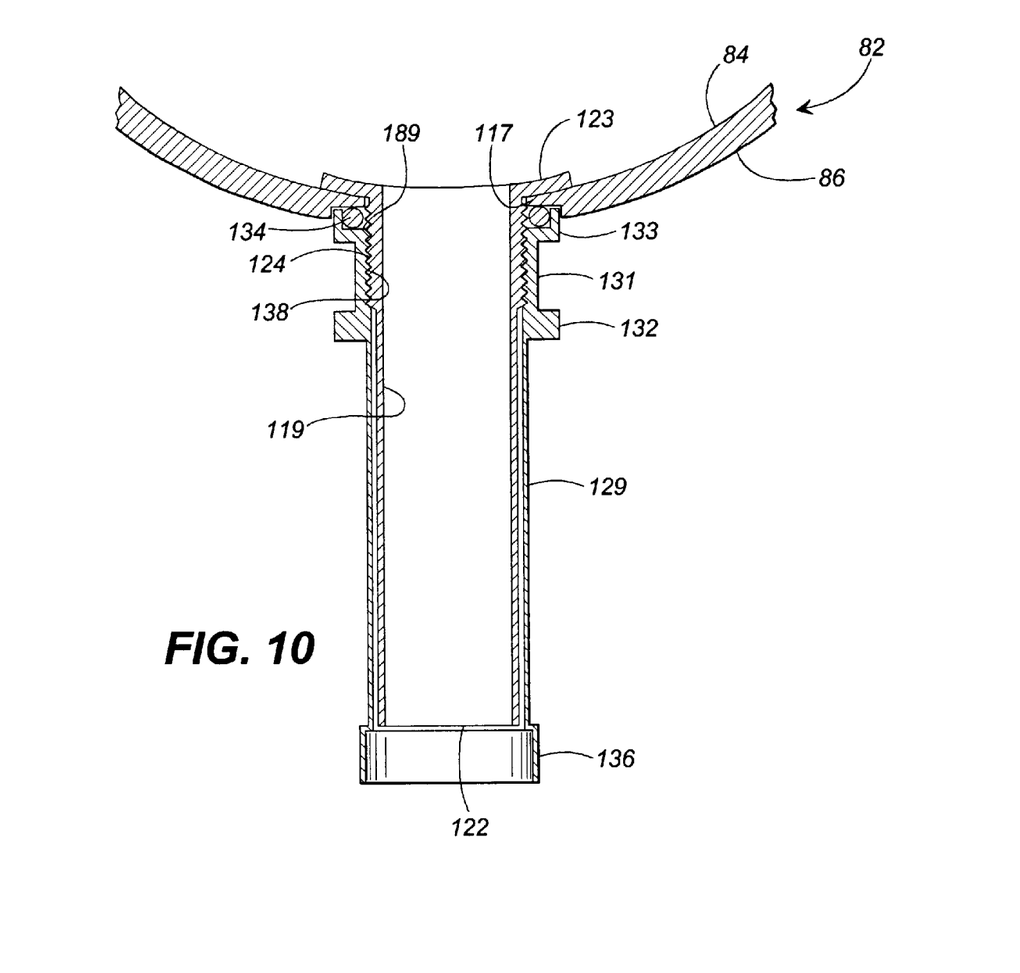
FIG. 10 is a cross-sectional view of the replacement overflow nipple assembly of FIG. 9 installed in a radiator mouth.

FIGS. 9 and 10 illustrate subsequent steps of the present invention to complete the repair of the broken radiator mouth assembly. The radiator mouth assembly 82, shown in phantom lines in FIG. 9 for clarity, has previously been prepared with the cutting tool as described above. A tubular insert 118 having a hollow body portion 119, an internal end 121 and an external end 122 is inserted through the port 116 from the inside of the radiator mouth assembly 82. The internal end 121 of the insert 118 is formed with a curved annular flange 123 that engages the inside wall of the radiator mouth assembly when the insert is fully advanced through the port 116. The tubular body 119 is further formed with a threaded portion 124 adjacent the curved flange 123 and extending therefrom a distance substantially greater than the thickness of the wall of the radiator mouth assembly 82 so that the threads are exposed on the outside of the radiator mouth assembly.

With the tubular insert 118 installed, a gasket 134, which preferably is made of a deformable material such as rubber, is inserted over the tubular insert 118 until it rests against the flat surface of the annular lip 117 surrounding the port 116. Finally, a tubular replacement nipple 126 is slid over and threaded onto the tubular insert 118 to complete the repair. The replacement nipple 126 is formed with a proximal end portion 127, a distal end portion 128, and a tubular body portion 129. The proximal end portion of the replacement nipple 126 is formed with internal threads 138 (FIG. 10) and an internally recessed flange 133 is formed on and projects radially from the extreme proximal end portion of the replacement nipple 126. A hexagonal nut 132 is formed on the proximal end portion of the replacement nipple 126 and the distal end portion of the replacement nipple 126 is formed with an expanded section 136 that has a diameter larger than the diameter of the body portion 129.

When the replacement nipple 126 is slid over the insert 118, it is threaded onto the treaded portion 124 of the insert and a wrench (not shown) can be used to tighten the internally recessed flange 133 against the gasket 134 to capture and compress the gasket and create a seal to complete the repair. With the replacement nipple installed, the overflow hose of the vehicle can then be slid over the end of the replacement nipple 126 and a complete fluid tight repair of the broken overflow nipple is accomplished.

FIG. 10 is a top cross sectional view of the installed replacement nipple assembly illustrating the relationship of the various components thereof. The radiator mouth 82 is seen to have a curved internal wall 84 and a curved external wall 86. The flange 123 on the internal end of the insert 119 is formed with a contour that is curved to match the curvature of the internal wall 84 of the radiator mouth 82 so that the flange rests and nestles against the internal wall of the radiator mouth. This serves both to create a minimum protrusion into the radiator mouth and to prevent the insert 119 from rotating in the port 116 as the replacement nipple 126 is threaded onto the insert to complete the repair. The rubber gasket 134 is seen captured and compressed between the flat annular lip 117 formed around the port 116 and the annular inside lip 189 of the internally recessed flange 133. With this configuration, a fluid and air tight seal is formed between the replacement nipple 126 and the radiator mouth 82. Such a seal is important for at least two reasons. First, the seal prevents leakage of coolant from inside the radiator mouth assembly. Second, and just as critical, the seal prevents the leakage of ambient air into the nipple assembly. This is important because, as the engine and coolant within the radiator cools and contracts, a partial vacuum is formed in the nipple, which draws coolant from the overflow reservoir back into the radiator. If air were to be drawn into the nipple at its junction with the radiator mouth during this process, then the coolant would remain in the reservoir and would not be drawn back into the radiator. Eventually, the coolant level in the radiator would drop to dangerous levels resulting in engine overheating, even though the overflow reservoir would still contain coolant indicating that the cooling system was fully charged. The unique method of providing a seal between the replacement overflow nipple and the radiator mouth illustrated by the present invention insures against such a desaster.

The invention has been described herein in terms of preferred embodiments and methodologies. It will be obvious to those of skill in the art, however, that various modifications might well be made to the illustrated embodiments without departing from the spirit and scope of the invention. For example, while the various components of this invention have been described as being formed from plastic and rubber materials, which are preferred, they can also be made from a variety of other materials including brass, steel, or aluminum. All such materials as well as variations and combinations thereof are contemplated to be within the scope of the present invention. Further, preferred configurations and profiles of the various components and preferred methodologies and sequences of steps for performing the process of the invention have been presented. Clearly, however, various additions, deletions, and modifications could be made to the illustrated configurations and methodologies by those of skill in the art without departing from the spirit and scope of the invention as set forth in the claims.

I claim:

1. A process of repairing the broken overflow tube nipple of a plastic radiator mouth, said process comprising the steps of:

(a) advancing a cutting tool having stepped cutter heads through the broken overflow tube nipple to remove remaining portions of the broken nipple and form an opening surrounded by a recessed annular lip in the radiator mouth;

(b) inserting a tubular insert having a body and an interior flange on one end through the opening from the inside of the radiator mouth until the flange rests against the radiator mouth and the body of the insert projects from the radiator mouth;

(c) installing a gasket over the projecting body portion of the insert until the gasket rests against the recessed annular lip formed in the radiator mouth;

(d) sliding a tubular nipple over the projecting body portion of the insert until a proximal end portion of the nipple is disposed adjacent the gasket; and (e) drawing the nipple onto the insert until the gasket is captured and compressed between the proximal end portion of the nipple and the annular recess to form a seal.

2. A process of repairing the broken overflow tube nipple of a plastic radiator mouth as claimed in claim 1 and wherein step (e) comprises threading the nipple onto the insert.

3. A process of repairing the broken overflow tube nipple of a plastic radiator mouth as claimed in claim 2 and further comprising the step of inserting a removable stop in the radiator mouth prior to step (a), the stop being configured to engage the advancing cutting tool to stop its advance at a predetermined depth appropriate to form the recessed annular lip.

4. A method of repairing a broken off overflow nipple of a radiator mouth assembly, said method comprising the steps of:

(a) removing remaining portions of the broken off overflow tube nipple to form an opening in the radiator mouth assembly;

(b) inserting a tubular insert through the opening in the radiator mouth assembly until a portion of the tubular insert projects from the radiator mouth assembly;

(c) installing a tubular replacement overflow tube nipple over the projecting portion of the insert; and (d) securing the replacement overflow tube nipple to the tubular insert to complete the repair.

5. A method of repairing a broken off overflow tube nipple of a radiator mouth assembly as claimed in claim 4 and wherein step (d) comprises treading the replacement overflow nipple onto the tubular insert until the replacement overflow tube nipple engages the radiator mouth assembly.

6. A method of repairing a broken off overflow nipple of a radiator mouth assembly as claimed in claim 5 and further comprising the step providing a gasket between the replacement overflow tube nipple and the radiator mouth assembly to create a seal.

7. A method of repairing a broken off overflow tube nipple of a radiator mouth assembly as claimed in claim 4 and wherein step (a) includes forming a substantially flat annular recessed lip around the opening in the radiator mouth assembly.

8. A method of repairing a broken off overflow tube nipple of a radiator mouth assembly as claimed in claim 7 and wherein step (a) comprises advancing a rotating cutting tool through the broken off overflow tube nipple.

9. A method of repairing a broken off overflow tube nipple of a radiator mouth assembly as claimed in claim 8 and wherein the cutting tool has stepped cutter heads, one of the cutter heads forming the opening in the radiator mouth assembly and the other forming the substantially flat annular recessed lip.

10. A method of repairing a broken off overflow tube nipple of a radiator mouth assembly as claimed in claim 9 and further comprising inserting a stop in the radiator mouth assembly prior to use of the cutting tool, the stop being configured to engage and stop the advance of the cutting tool when the opening and substantially flat annular recess have been properly formed.

11. A method of repairing a broken off overflow tube nipple of a radiator mouth assembly as claimed in claim 10 and wherein the stop is generally spool shaped with a hub and spaced upper and lower flanges, the upper and lower flanges holding the hub in place at the proper position to engage and stop the advance of the cutting tool.

12. A method of repairing a broken off overflow tube nipple of a radiator mouth assembly as claimed in claim 4 and where in step (b) the tubular insert is formed with a flange on its interior end and wherein the step of inserting the tubular insert comprises inserting the tubular insert through the opening from the inside of the radiator mouth assembly until the flange rests against the inside wall of the radiator mouth assembly.

13. A method of repairing a broken off overflow tube nipple of a radiator mouth assembly as claimed in claim 12 and wherein the flange is curved to correspond to the curvature of the radiator mouth assembly.

* * * * *